United States Patent
Waddell

(10) Patent No.: US 7,168,230 B1
(45) Date of Patent: Jan. 30, 2007

(54) APPARATUS FOR GATHERING, PICKING UP AND CARRYING LOOSE MATERIALS

(76) Inventor: Herbert Howell Waddell, 98 Robbins Ave., Berkeley Heights, NJ (US) 07922

( * ) Notice: Subject to any disclaimer, the term of this patent is extended or adjusted under 35 U.S.C. 154(b) by 925 days.

(21) Appl. No.: 09/693,239

(22) Filed: Oct. 20, 2000

Related U.S. Application Data

(60) Provisional application No. 60/160,660, filed on Oct. 21, 1999.

(51) Int. Cl.
*A01D 7/10* (2006.01)

(52) U.S. Cl. .................... 56/400.12; 294/50.6

(58) Field of Classification Search ........... 56/400.01, 56/400.04, 400.12, 400.18; 294/50.5, 50.6, 294/50.9, 51, 52; 403/389, 400, 396, 397
See application file for complete search history.

(56) References Cited

U.S. PATENT DOCUMENTS

| | | | | | |
|---|---|---|---|---|---|
| 318,359 | A | * | 5/1885 | Davis ................ | 56/400.12 |
| 2,997,328 | A | * | 8/1961 | Lee .................. | 294/99.2 |
| 3,323,825 | A | * | 6/1967 | Arima ............... | 294/99.2 |
| 3,521,332 | A | * | 7/1970 | Kramer ............. | 403/188 |
| 3,688,484 | A | * | 9/1972 | Cox et al. .......... | 56/400.12 |
| 4,688,961 | A | * | 8/1987 | Shioda et al. ...... | 403/389 |
| D295,725 | S | * | 5/1988 | Shioda .............. | D8/396 |
| 4,787,663 | A | * | 11/1988 | Laramie ............ | 294/99.2 |
| 4,793,645 | A | * | 12/1988 | Decker ............. | 294/58 |
| 5,564,266 | A | * | 10/1996 | Laughlin ........... | 56/400.12 |
| 5,564,267 | A | * | 10/1996 | Bricker et al. ..... | 56/400.12 |
| 5,697,659 | A | * | 12/1997 | Calagui ............. | 294/99.2 |
| 6,068,315 | A | * | 5/2000 | Vaughter ........... | 294/50.8 |
| 6,120,073 | A | * | 9/2000 | Jones ............... | 294/50.8 |

* cited by examiner

Primary Examiner—Meredith C. Petravick
(74) Attorney, Agent, or Firm—Law Offices of Albert Wai-Kit Chan, LLC

(57) ABSTRACT

An apparatus for gathering, picking up and carrying loose materials such as dirt, leaves, debris, trash, hay, ice, snow and other materials or objects consists of two grasping elements which each have shafts with grasping devices or heads at one end, and a coupling which joins their shafts. The grasping elements can be commercially available rakes or shovels. Loose materials are gathered and picked up by placing one hand on the shaft of each grasping element and drawing the heads together. The coupling is flexible and can be moved along the shafts of the grasping elements to change the manner in which the elements function together. When the coupling is positioned at the end near the grasping heads, the apparatus functions in the manner of a post hole digger. When it is positioned near the middle or far end of the shafts, the apparatus functions in the manner of rake tongs or tweezers tongs.

40 Claims, 1 Drawing Sheet

APPARATUS FOR GATHERING, PICKING UP AND CARRYING LOOSE MATERIALS

PRIORITY

Priority for this application is claimed under Provisional Application No. 60/160,660, filed Oct. 21, 1999.

BACKGROUND

It is difficult to pick up large quantities of dirt, leaves, debris, trash, hay and other loose items with a single rake, scoop or shovel. For example, when leaves are raked into a pile, one must hold leaves on the rake with one hand, while holding the handle of the rake with the other hand, to put the leaves into a container for disposal. An improvement is achieved by using two rakes, but with only one hand on each rake handle it is difficult to control the rakes, and only a small amount of leaves can be picked up and carried in this manner. This problem has been addressed by a number of inventions that employ two opposing rakes that are mechanically attached to each other, but each of these inventions has shortcomings.

Dirksen, 4,991,386, Fiorentino, 4,037,397 and Cox, 3,688,484 are examples of devices comprising two rakes that are pivotably connected to work together as tongs for picking up accumulations of leaves or debris. Jones, 6,120,073 also pivotably connects two rakes, but adds a third element, a handle. All of these devices connect the two rakes with a permanent, non-adjustable pivot joint, so the rakes cannot be separated and used individually for raking materials together.

Sipe, 4,018,038, Hand Rake with Grasping Tines claims a device that employs two opposing sets of tines that are brought together to pick up leaves, etc. by operating a lever on the handle. This device is not suitable for use as a rake, is expensive and complicated and has a fixed pivot point.

Laughlin, 5,564,266, Grass Rake Tongs, claims a device in which two rake handles are joined by a pivot to form a pair of tongs, with which large quantities of leaves can be collected by placing one hand at the top of each handle and mechanically bringing the heads of the rakes (the assembly of tines) together. This has the disadvantage of being a large, rigid, inflexible apparatus that does not conform easily to uneven surfaces. By rotating the handles so that the tines of each rake are at opposite ends of the assembly, one head can be used for raking leaves into a pile, but both handles must be held firmly to accomplish this and the weight of the unused head is burdensome. The rakes cannot be separated and used independently, and the pivot point cannot be changed to accomplish different tasks.

Frankhauser, 5,765,351, Detachable garden rake pick-up attachment, cites many attempts to adapt garden rakes for picking up materials by permanently modifying the rakes with expensive pick-up attachments, and claims an attachment that can be added to, and removed from, a standard garden rake. The device of Frankenhauser comprises a set of tines that can be brought into opposition with the standard rake tines by operating a lever. The Frankhauser device is designed for use only with a garden rake of a specific design, is relatively complicated, expensive and not easily attached or removed.

From the foregoing it is obvious that a number of inventors have attempted to solve the problem of combining a rake and pick-up device. However, garden rake manufacturers have not found a device that does so in a manner that is convenient and economical enough to be marketable for general use.

SUMMARY OF THE INVENTION

The invention is an apparatus for a person to use for manually gathering, picking up and carrying materials such as dirt, leaves, debris, trash, hay, ice, snow and other loose materials or objects. The apparatus is made up of two elements which each have shafts with grasping means at one end, which shafts are joined by a flexible, moveable and removeable coupling in such a way that the grasping means of both elements can be brought together to draw loose items between them and to hold said loose items between them. The coupling holds the shafts together at one point, allowing a person to use one hand at another point on each shaft to bring the grasping elements together with loose materials between them. The coupling acts like a second hand on each shaft by giving the user control at two points on each shaft. This permits application of more force than could otherwise be used. The coupling can be placed anywhere along the shafts at the convenience of the user to facilitate drawing together of the grasping means. When the grasping means are drawn together the user can hold the grasping elements together by holding the shafts together at a location remote from the coupling with the coupling still operating like a second hand on the shafts. The entire apparatus can then be lifted, with only a single hand if desired, to transport the loose items to another location, where they are released by separating the grasping means of the two elements. The coupling may be removed from one or both elements to permit their use separately. The elements with grasping means can be commercially available rakes or shovels.

BRIEF DESCRIPTION OF DRAWINGS

In FIG. 1, the coupling is near the top end of the rake handles. In this conformation, the handles are grasped towards their lower ends and drawn together to collect the loose materials between the rakes. Then the lower ends of the handles are held together with one or both hands, the apparatus is lifted and carried away. To release the debris, the handles are drawn apart.

In FIG. 2, the coupling is near the bottom end of the rake handles. In this conformation, the handles are grasped towards their upper ends and drawn together to collect the loose materials between the rakes. Then the upper ends of the handles are held together with one or both hands, the apparatus is lifted and carried away. To release the debris, the handles are drawn apart.

Figure 3:
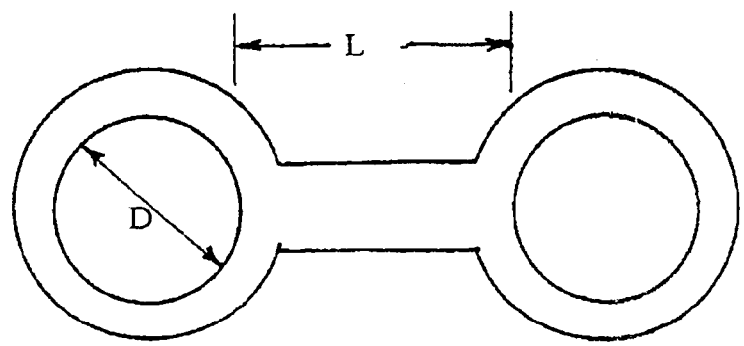
FIG. 3 shows one design for the coupling means. It comprises two loops with an internal diameter of (D), which is just large enough to permit them to slip loosely over the handles of the rakes. In this example, the loop diameters are about one inch so that they can slip onto rake handles about $7/8$ths of an inch in diameter. The loops are joined at a distance (L) by a flexible band. In this example, L is about one and a half inches, the connecting band is about $1/4$ inch thick and about $1/2$ inch wide, and the cross section of the loop material is circular with a diameter of $3/16$ths of an inch.

The design shown in FIG. 3 is suitable for a molded coupling made from medium-hardness, weather-resistant rubber.

DETAILED DESCRIPTION OF THE INVENTION

Figures 1, 2:
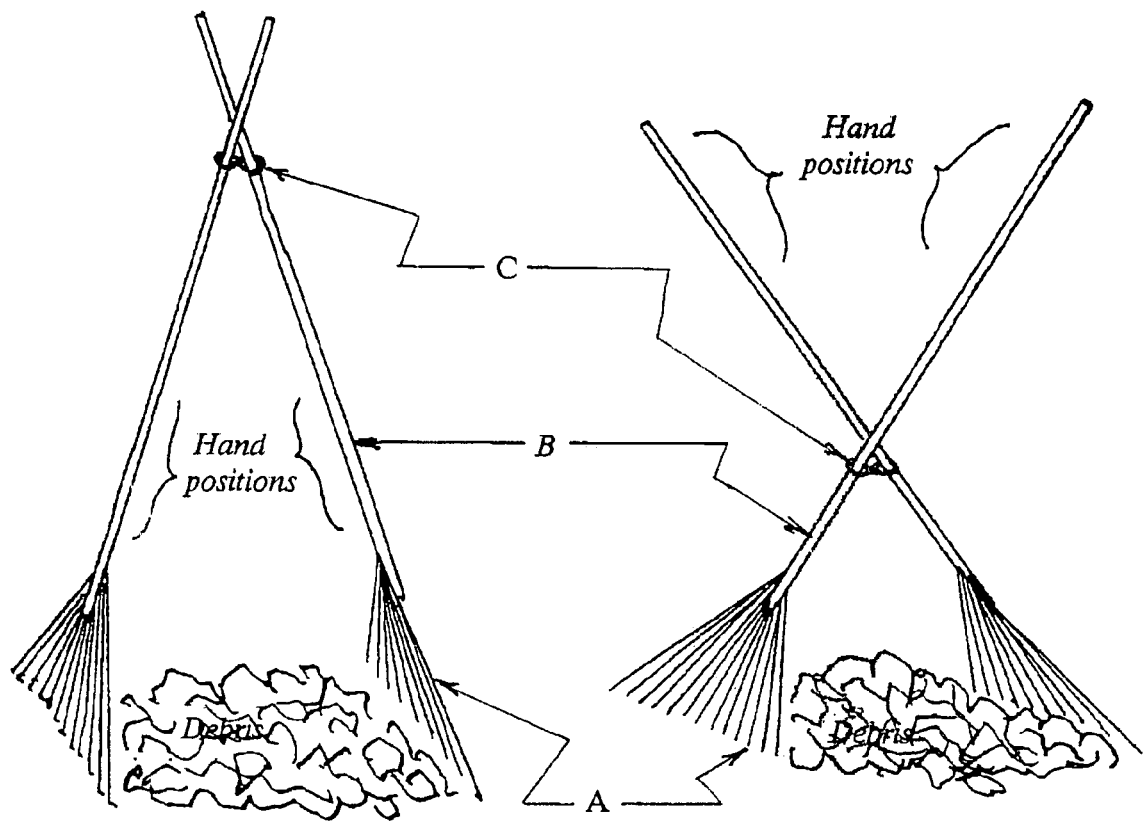
FIGS. 1 and 2 show the apparatus employing commercial garden rakes (B) with wire tines (A) as the grasping elements. They are in position to gather and pick up debris, leaves or other loose materials. The rakes are connected by the flexible coupling (C).

The present invention overcomes the shortcomings of earlier devices for collecting, picking up and carrying loose materials. This is illustrated by a preferred embodiment of such a device wherein an adjustable, flexible, removeable coupling joins the handles of two standard leaf rakes having handles with diameters of about ⅞ inches. The coupling has loops that slip over the handles of the rakes. The coupling is made of weather-resistant rubber, wherein the loops and a connecting band that separates the handles are molded into one part as in FIG. 3. The diameter of the loops is about one inch, which is large enough to be slipped easily over the handles, but not so large that they slip out of place unintentionally. The coupling separates the loops, and hence the handles, by about one and one half inches. The loops allow each rake to rotate within its loop on its axis. The flexible connecting band of the coupling permits the rakes to pivot in any direction around the point where the rakes are coupled. The coupling can be positioned anywhere along the handles of the rakes. Large quantities of leaves can be collected by pulling the heads of the rakes (the assembly of tines) together in one of two ways: either with the coupling near the top of the handles and the hands near the heads, so that the coupling acts like a hinge (FIG. 1); or with the coupling near the rake heads and the hands near the tops of the handles, so that the device acts like tongs (FIG. 2).

The coupling can be slipped off of one rake handle to use the rakes individually for raking leaves into a pile. Then the coupling device is slipped on both handles and positioned about 1 to 18 inches from the top of the handles. In this configuration (FIG. 1), with one hand placed on each handle about a foot above the rake head, the device can be used to sweep leaves into a heap, and the heads can be easily drawn together to collect the piled leaves. The flexibility of the coupling allows the rakes to be adjusted to uneven surfaces. The device can then be held closed with one or both hands and lifted to carry the leaves entrapped between the rake heads to a container or disposal site. Alternatively, the coupling can be placed near the lower end of the device, about 1 to 12 inches from the rake heads. In this configuration (FIG. 2), piled leaves can be picked up by placing one hand on each handle between the coupling and the upper end of the handles, spreading the handles apart, placing the opened rake heads in the leaves and bringing the handles together to collect leaves between the rake heads as they close up to each other. Holding the handles together with one or both hands, the device is then lifted to carry the collected leaves to a container or disposal site.

In a similar manner, two shovels can be coupled and used like a post hole digger to dig holes in dirt. A post hole digger has a permanent hinged connection between the handles of two narrow shovels near the head of the shovels. To operate it, the handles are held close together and the shovel, or head, ends are thrust sharply into the ground. Then the handles are spread to hold soil between the shovel heads, and the post hole digger is lifted. The present invention uses a removeable coupling, which can be used on any individual shovels. Maximum holding capacity is achieved when two shovels of equal size are used. If the coupling is near the head as in a post hole digger, maximum leverage is exerted to loosen a portion of dirt, which can then be picked up by spreading the handles apart at the top to draw the heads of the shovels together. If the coupling is near the upper end of the handles, the heads can be spread further apart to pick up a larger quantity of dirt, but a greater force is required to hold the shovel heads together than when the coupling is near the bottom of the handles. The former arrangement is preferred for firm soil, and the latter for loose soil, sand, etc. Either configuration can also be used with snow shovels to collect, lift and carry snow without bending over.

The coupling can be made from a wide variety of different flexible materials, such as rubber, plastic, rope, leather, or the like. The coupling can be fabricated by compression or injection molding, braiding, by being cut from a sheet of suitable material (such as the side walls of discarded auto tires) or by another suitable method. The preferred material is a weather-resistant elastomeric composition, such as ethylene/propylene rubber or urethane. Such materials are strong, flexible and grip the handles of the grasping device enough so that they do not slip in use, while being loose enough to be slipped on and off without difficulty. The cross sectional dimensions of the loop should be great enough to provide strength to resist the force of drawing the heads together, and the loops should be stiff enough to remain open when they are being slipped over the shafts of the grasping devices. The loop should be large enough that it can be slid over the end of the handle and into the desired position, but not so loose as to slip out of position. The flexibility of the loop and the friction between it and the handle will then keep the loop in place during use.

Alternatively, the coupling device can be made of material that is not by itself flexible, but is fabricated into a flexible assembly, such as metal or plastic interlocking links in a short chain that joins loops that slip around the handles. If metal or hard plastic loops are used, they should fit snugly enough to keep them from sliding out of the desired places on the handles, or may incorporate clamping devices to prevent the loops from slipping out of place on the handles during use.

Whether by reason of inherent flexibility of the coupling material or the flexibility imparted by fabrication of inflexible material into a flexible assembly, the flexibility of the coupling imparts benefits over a rigid pivot, namely that the shafts can move to a restricted extent in any way with respect to each other.

Grasping devices with similar configurations of their parts to those of this invention have been used widely for a very long time. However, the present invention is distinguished from them in important ways. Configuration 1 is similar in action to tweezers or tongs that are made by connecting two elements at one end so that their other ends, the grasping ends, are separated by spring action. They are operated by forcing the grasping ends together to pick up objects. Unlike the present invention, they are not separable and the connection between the two grasping elements is not flexible or adjustable. Configuration 2 is similar in action to scissor type tongs, where two elements are joined near the grasping end with a mechanical hinge and the handles are drawn apart to open them and drawn together to close them together on an object. Pliers and scissors have two grasping or cutting elements configured in this manner. Some of these devices can be taken apart for cleaning. Unlike the present invention, these other known devices have fixed couplings that cannot be moved along the handles, and if they can be disconnected, the two separate elements are generally not useful when separated. The present invention advances the art by combining two similar elements that are individually useful in such a way that they are more useful combined than when used individually and permitting the user to adapt their configuration as desired.

What is claimed is:

1. An apparatus for gathering, picking up and carrying materials comprising:
   a) two grasping elements which each have a shaft with a grasping head at one end;
   b) flexible coupling means which can be moved along the shafts of the grasping elements to connect them together while permitting each of the grasping elements to rotate along the axes of their shafts and to pivot with respect to each other so that the grasping heads can be brought together or moved apart from each other;
   c) wherein each shaft has a length of two to six feet; and
   d) wherein each grasping head consists of tines arrayed to form a rake.

2. An apparatus as in claim 1, wherein the shafts have a diameter of 0.5 to 3 inches.

3. An apparatus as in claim 1, wherein the coupling means consists of two loops that have diameters slightly larger than the diameters of the shafts to be connected and said loops are connected by a flexible linkage means having a length of one-fourth to four inches.

4. An apparatus as in claim 3, wherein the entire coupling means is molded of or cut from sheets of an inherently flexible material.

5. An apparatus as in claim 3, wherein the flexible linkage of the coupling means is made of a rigid material fabricated in the form of a chain to impart flexibility.

6. An apparatus as in claim 3, wherein the flexible linkage means is a band of flexible material.

7. An apparatus as in claim 3, wherein the loops of the coupling means contain clamping devices that permit them to be moved along the shafts to a desired position and then clamped there to prevent further unwanted movement.

8. An apparatus as in claim 3, wherein the coupling means is made from rubber.

9. An apparatus as in claim 3, wherein the coupling means is made from plastic.

10. An apparatus as in claim 3, wherein the coupling means is made from metal.

11. An apparatus for gathering, picking up and carrying materials comprising:
   a) two rakes which each have a shaft with a grasping head at one end;
   b) flexible coupling means which can be moved along the shafts of the rakes to connect them together while permitting each of the rakes to rotate along the axes of their shafts and to pivot with respect to each other so that the grasping heads can be brought together or moved apart from each other; and
   c) wherein each shaft has a length of two to six feet.

12. An apparatus as in claim 11, wherein the shafts have a diameter of 0.5 to 3 inches.

13. An apparatus as in claim 11, wherein the coupling means consists of two loops that have diameters slightly larger than the diameters of the shafts to be connected and said loops are connected by a flexible linkage means having a length of one-fourth to four inches.

14. An apparatus as in claim 13, wherein the entire coupling means is molded of or cut from sheets of an inherently flexible material.

15. An apparatus as in claim 13, wherein the flexible linkage of the coupling means is made of a rigid material fabricated in the form of a chain to impart flexibility.

16. An apparatus as in claim 13, wherein the flexible linkage means is a band of flexible material.

17. An apparatus as in claim 13, wherein the loops of the coupling means contain clamping devices that permit them to be moved along the shafts to a desired position and then clamped there to prevent further unwanted movement.

18. An apparatus as in claim 13, wherein the coupling means is made from rubber.

19. An apparatus as in claim 13, wherein the coupling means is made from plastic.

20. An apparatus as in claim 13, wherein the coupling means is made from metal.

21. An apparatus for gathering, picking up and carrying materials comprising:
   a) two shovels, for shoveling dirt, snow or other material, which each have a shaft with a grasping head at one end;
   b) flexible coupling means which can be moved along the shafts of the shovels to connect them together while permitting each of the shovels to rotate along the axes of their shafts and to pivot with respect to each other so that the grasping heads can be brought together or moved apart from each other;
   c) wherein each shaft has a length of two to six feet.

22. An apparatus as in claim 21, wherein the shafts have a diameter of 0.5 to 3 inches.

23. An apparatus as in claim 21, wherein the coupling means consists of two loops that have diameters slightly larger than the diameters of the shafts to be connected and said loops are connected by a flexible linkage means having a length of one-fourth to four inches.

24. An apparatus as in claim 23, wherein the entire coupling means is molded of or cut from sheets of an inherently flexible material.

25. An apparatus as in claim 23, wherein the flexible linkage of the coupling means is made of a rigid material fabricated in the form of a chain to impart flexibility.

26. An apparatus as in claim 23, wherein the flexible linkage means is a band of flexible material.

27. An apparatus as in claim 23, wherein the loops of the coupling means contain clamping devices that permit them to be moved along the shafts to a desired position and then clamped there to prevent further unwanted movement.

28. An apparatus as in claim 23, wherein the coupling means is made from rubber.

29. An apparatus as in claim 23, wherein the coupling means is made from plastic.

30. An apparatus as in claim 23, wherein the coupling means is made from metal.

31. An apparatus for gathering, picking up and carrying materials comprising:
   a) two grasping elements which each have a shaft with a grasping head at one end;
   b) flexible coupling means which can be moved along the shafts of the grasping elements to connect them together while permitting each of the grasping elements to rotate along the axes of their shafts and to pivot with respect to each other so that the grasping heads can be brought together or moved apart from each other;
   c) wherein each shaft has a length of two to six feet; and
   d) wherein each grasping head consists of shovel head that is fabricated from sheets of metal, wood or plastic and that extends along the axes of the shaft for three to eighteen inches and extends sideways equally on both sides of the shaft for a total wide of three to twenty four inches.

32. An apparatus as in claim 31, wherein the shafts have a diameter of 0.5 to 3 inches.

33. An apparatus as in claim 31, wherein the coupling means consists of two loops that have diameters slightly larger than the diameters of the shafts to be connected and said loops are connected by a flexible linkage means having a length of one-fourth to four inches.

34. An apparatus as in claim 33, wherein the entire coupling means is molded of or cut from sheets of an inherently flexible material.

35. An apparatus as in claim 33, wherein the flexible linkage of the coupling means is made of a rigid material fabricated in the form of a chain to impart flexibility.

36. An apparatus as in claim 33, wherein the flexible linkage means is a band of flexible material.

37. An apparatus as in claim 33, wherein the loops of the coupling means contain clamping devices that permit them to be moved along the shafts to a desired position and then clamped there to prevent further unwanted movement.

38. An apparatus as in claim 33, wherein the coupling means is made from rubber.

39. An apparatus as in claim 33, wherein the coupling means is made from plastic.

40. An apparatus as in claim 33, wherein the coupling means is made from metal.

* * * * *